US010713326B2

(12) United States Patent
Mehta

(10) Patent No.: US 10,713,326 B2
(45) Date of Patent: Jul. 14, 2020

(54) SEARCH AND NOTIFICATION IN RESPONSE TO A REQUEST

(71) Applicant: eBay Inc., San Jose, CA (US)

(72) Inventor: Jigish Mehta, Fremont, CA (US)

(73) Assignee: eBay Inc., San Jose, CA (US)

( * ) Notice: Subject to any disclaimer, the term of this patent is extended or adjusted under 35 U.S.C. 154(b) by 105 days.

(21) Appl. No.: 15/973,780

(22) Filed: May 8, 2018

(65) Prior Publication Data

US 2018/0253437 A1 Sep. 6, 2018

Related U.S. Application Data

(63) Continuation of application No. 14/935,135, filed on Nov. 6, 2015, now Pat. No. 9,984,169.

(51) Int. Cl.
| | |
|---|---|
| *G06F 16/9537* | (2019.01) |
| *H04L 29/08* | (2006.01) |
| *G08B 5/36* | (2006.01) |
| *G06F 16/29* | (2019.01) |
| *H04W 4/02* | (2018.01) |
| *H04W 4/35* | (2018.01) |

(52) U.S. Cl.
CPC .......... *G06F 16/9537* (2019.01); *G06F 16/29* (2019.01); *G08B 5/36* (2013.01); *H04L 67/12* (2013.01); *H04W 4/023* (2013.01); *H04W 4/35* (2018.02)

(58) Field of Classification Search
CPC ...... G06F 16/9537; G06F 16/29; H04W 4/35; G08B 5/36
USPC ...................................................... 340/686.1
See application file for complete search history.

(56) References Cited

U.S. PATENT DOCUMENTS

| | | | |
|---|---|---|---|
| 5,939,981 A | 8/1999 | Renney | |
| 6,331,817 B1 | 12/2001 | Goldberg | |
| 6,674,364 B1 * | 1/2004 | Holbrook | G08B 21/24 |
| | | | 340/539.32 |
| 7,034,684 B2 * | 4/2006 | Boman | G08B 13/1427 |
| | | | 340/539.11 |
| 7,817,038 B2 | 10/2010 | Torning | |
| 8,866,607 B2 | 10/2014 | Velusamy | |
| 8,866,612 B1 | 10/2014 | Foster | |
| 9,016,562 B1 | 4/2015 | Tredoux et al. | |
| 9,424,598 B1 | 8/2016 | Kraft | |

(Continued)

OTHER PUBLICATIONS

Applicant Initiated Interview Summary received for U.S. Appl. No. 14/935,135, dated Dec. 6, 2017, 3 pages.

(Continued)

*Primary Examiner* — Jack K Wang
(74) *Attorney, Agent, or Firm* — Newport IP, LLC

(57) ABSTRACT

Disclosed are methods and systems for displaying a location of an item in a user interface. Some aspects include processing circuitry and hardware memory storing instructions that when executed cause the processing circuitry to perform operations. The operations may include receiving input defining an image of an item, receiving input indicating an instruction to search a plurality of sensor data for the item, each sensor data generated by a corresponding imaging sensor and including a corresponding image, and displaying a location of the item in a user interface, the location corresponding to a location of one of the imaging sensors generating a corresponding image representing the item.

20 Claims, 11 Drawing Sheets

(56) References Cited

U.S. PATENT DOCUMENTS

| | | |
|---|---|---|
| 9,984,169 B2 | 5/2018 | Mehta |
| 2011/0153614 A1 | 6/2011 | Solomon |
| 2013/0136363 A1* | 5/2013 | Na .................... G06K 9/00456 |
| | | 382/190 |
| 2016/0075193 A1 | 3/2016 | Huang |
| 2016/0286210 A1 | 9/2016 | Border et al. |
| 2016/0371630 A1 | 12/2016 | Jetcheva et al. |
| 2017/0005826 A1* | 1/2017 | Youn .................. H04L 12/2825 |
| 2017/0132234 A1 | 5/2017 | Mehta |
| 2017/0169672 A1* | 6/2017 | Farrow .............. G06K 7/10366 |

OTHER PUBLICATIONS

Non-Final Office Action received for U.S. Appl. No. 14/935,135, dated Apr. 6, 2017, 14 pages.
Notice of Allowance Received for U.S. Appl. No. 14/935,135 dated Feb. 1, 2018, 11 pages.
Response to Non-Final Office Action Action filed on Sep. 6, 2017 for U.S. Appl. No. 14/935,135, dated Apr. 6, 2017, 10 pages.

\* cited by examiner

SEARCH AND NOTIFICATION IN RESPONSE TO A REQUEST

PRIORITY APPLICATIONS

This application is a continuation application of U.S. patent application Ser. No. 14/935,135, filed. Nov. 6, 2015 and entitled "SEARCH AND NOTIFICATION IN RESPONSE TO A REQUEST." The contents of this prior application are considered part of this application, and are hereby incorporated by reference in their entirety.

TECHNICAL FIELD

Embodiments of the present disclosure relate generally to data processing and, more particularly, but not by way of limitation, to systems and methods for search and notification.

BACKGROUND

Conventionally, users of a publication system will browse a web page hosted by the network publication system. In some instances, the user will browse the web page in order to search for items that are published by the network publication system.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows discusses systems, methods, techniques, instruction sequences, and computing machine program products that embody illustrative embodiments of the description. In the following description, for the purposes of explanation, numerous specific details are set forth in order to provide an understanding of various embodiments of the subject matter discussed herein. It will be evident, however, to those skilled in the art, that embodiments of the subject matter may be practiced without these specific details.

In various example embodiments, a search system is provided. Sensor data is received, by the search system, from sensors that are placed around a certain area, such as a home or an office. Moreover, the sensor data indicates items are located near the sensors. Further, the search system stores the sensor data in a database. The search system uses the sensor data to locate items that are searched for by a user of the search system. The user may send a request to the search system and include search parameters in the request. Using the search parameters and the sensor data, the search system locates an item that matches the search parameters. Moreover, the search system is capable of sending notifications that indicate that an item is moved. Also, the search system sends notifications that indicate that a number of items falls below a certain threshold.

Figure 1:
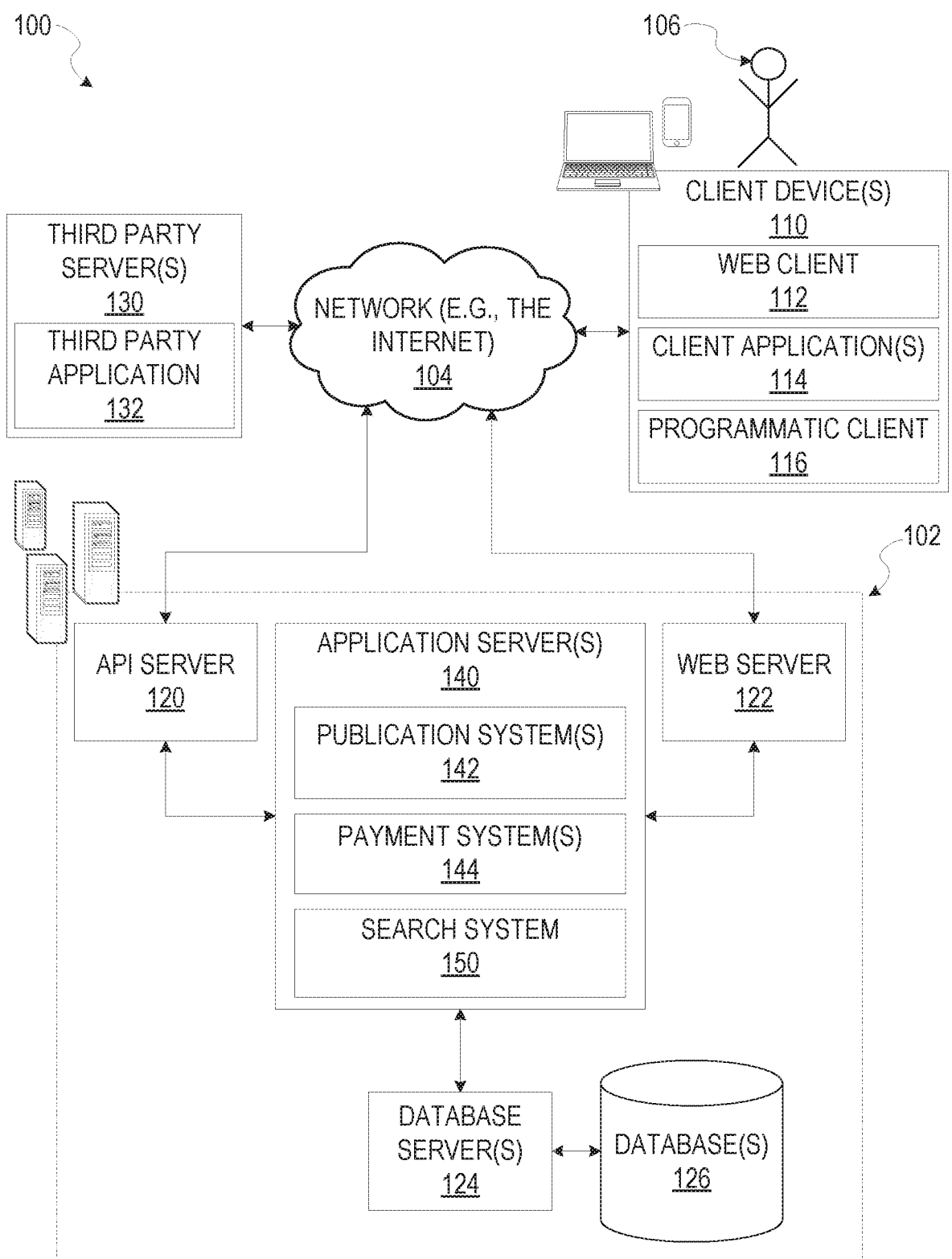
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, laptops, multi-processor systems, a sensor, microprocessor-based or programmable consumer electronics, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for these marketplace transactions. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, or payment functions that are supported by the relevant applications of the networked system 102.

The publication systems 142 provide a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The search system 150 provides functionality operable to perform a search for items that are located within a predefined distance from one or more sensors. For example, the search system 150 may receive sensor data each of the one or more sensors. Further, the search system 150 retrieves item identifiers from the databases 126, the third party servers 130, the publication system 142, and other sources. In some example embodiments, the search system 150 analyzes the item identifiers and the sensor data to determine a location of an item that is searched for by a user. In some example embodiments, the search system 150 communicates with the publication systems 142 (e.g., accessing item listings) and payment system 144. In an alternative embodiment, the search system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and search system 150 could also be implemented as standalone software programs, which do not necessarily have networking capabilities.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
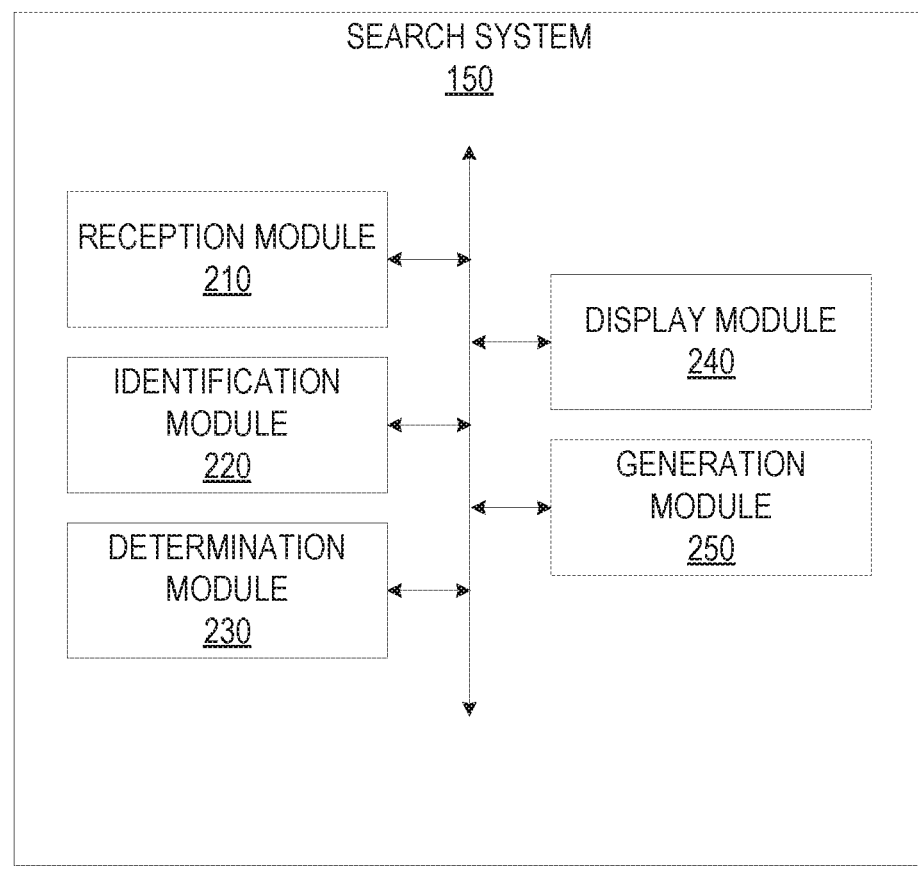
FIG. 2 is a block diagram illustrating components of a search system, according to some example embodiments.

FIG. 2 is a block diagram illustrating components of the search system 150, according to some example embodiments. The search system 150 is shown as including a reception module 210, an identification module 220, a determination module 230, a display module 240, and a generation module 250, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various embodiments, the reception module 210 is configured to receive a request to search for an item. The request is received from a client device (e.g., mobile device) operated by a user. Moreover, the request includes search parameters that identify the searched item. For example, the search parameters may include an image of the searched item. In other words, a user of the client device may have previously saved a picture of the item on the client device. Also, the search parameters may include keywords or a description of the searched item.

In various example embodiments, the reception module 210 is configured to receive sensor data that indicates items located within a predefined distance from a sensor. Moreover, the sensor data is received from the sensor. In some cases, sensor data is received from more than one sensor (e.g., a first sensor or a second sensor). Further, each of the sensors is in communication with a server (e.g., the search system 150) via the network. In some instances, the sensor data includes visual data that indicates the items located within the predefined distance from the sensor. In other words, the visual data covers an area within the predefined distance from the sensor. Further, the sensor is a device is a used to capture the visual data. For example, the sensor may include a camera that is used to capture the visual data.

In some instances, the sensor data includes visual data that indicates identifiers of the items located within the predefined distance from the sensor. More specifically, the items are labeled with identifying information, and the sensor includes a scanner that is used to capture the identifiers being used to label the items located within the predefined distance from the sensor. For example, the items may each be labeled with a barcode. The sensor will extract barcodes from each of the items and send the barcodes over to the reception module 210 as part of the sensor data.

In further embodiments, the reception module 210 is configured to receive a request from the client device to receive notifications regarding the items within the predefined distance from the sensor. In some instances, the request from the client device indicates a threshold number. As further explained below, the request from the client device may be a request to receive notifications from the search system 150 regarding items tracked by the sensors.

In various embodiments, the identification module 220 is configured to use the sensor data to retrieve additional identifiers (e.g., descriptive information) for the items that are located within the predefined distance from the sensor. For instance, the identification module 220 is to use the scanned barcode to retrieve the additional identifier (e.g., descriptive information) for an item. In other words, an item barcode may be used to retrieve descriptive information for an item that corresponds to the item barcode.

In some instances, the items indicated by the sensor data are items that are similar to items that are listed by a network publication system. Moreover, information regarding the items that are listed by the network publication system may be stored in an item database. Accordingly, the identification module 220 is further to retrieve information regarding the listed items from the item database. Further, the information regarding the listed items may be used to identify the items that are located within the predefined distance from the sensor.

For example, an item indicated by the sensor data is similar to an item that was published by the network publication system (e.g., share the same barcode number, share the same identification number, and the like). Further, the information regarding the item that was published by the network publication system is received from a seller of the item, and the received information is stored in the item database. Using the information from the item database, the identification module 220 is to retrieve the additional identifiers for the item indicated by the sensor data. Accordingly, information regarding items that are listed by a network publication system may be stored by the network publication system in a database and retrieved by the identification module 220 from the database. Alternatively, the identification module 220 receives the additional identifiers from other applications running on other devices, such as a client device 110 of a further user.

In further embodiments, the identification module 220 is to count a number of items located within the predefined distance from the sensor based on the sensor data. The number of items is compared with the threshold number indicated in the request in order to determine whether a notification is to be displayed.

In various embodiments, the determination module 230 is configured to determine that the search parameters match with a corresponding item among the items indicated by the sensor data as being located within the predefined distance from the sensor. The determination module 230 determines the match using the sensor data. More specifically, the determination module 230 compares the search parameters with the sensor data in order to determine the match. In the case that the search parameters is an image of the searched object, the determination module 230 is to compare the image of the searched object with visual data that indicates one of the items located within the predefined distance from the sensor. In other words, the determination module 230 uses image recognition to match the image of the searched object with one of the items indicated by the sensor data. In the case that the search parameters is a description of the searched object, the determination module 230 is to compare the description of the searched item with the retrieved identifier of one of the items located within the predefined distance from the sensor. In other words, the determination module 230 determines that the description of the searched item matches with the identifier of one of the items located within the predefined distance from the sensor. More specifically, the determination module 230 determines that the description of the searched item matches with an identifier for the corresponding item.

In further embodiments, the determination module 230 is to determine the match based on the additional identifiers for the items that are located within the predefined distance from the sensor with the search parameters. More specifically, the additional identifiers includes an additional identifier for the corresponding item. Further, the determination module 230 matches the additional identifier for the corresponding item with the search parameters (e.g., description of the searched item) received from the client device.

In further embodiments, the determination module 230 is configured to determine a location of the searched item based on the match performed by the determination module 230. In other words, the location of the searched item is determined as being where the corresponding item is located. For example, the search parameters received from the client device matches with the corresponding item, and therefore the location of the searched item is also a location of the corresponding item. Accordingly, the determination module 230 is further to determine the location of the corresponding item among the items indicated by the sensor data as being within the predefined distance from the sensor.

The determination module 230, in some embodiments, determines that the location of the corresponding item is a location within the predefined distance from the sensor. More specifically, the location of the corresponding item is determined by the determination module 230 as being a location of the sensor. For example, the sensor may be placed on a kitchen counter, and the location of the corresponding item is determined to also be the kitchen counter because the corresponding item is located within the predefined distance from the sensor. In further embodiments, the determination module 230 is to determine that the counted number of items within the predefined distance from the sensor is less than the threshold number indicated in a request received by the reception module 210.

In further embodiments, the determination module 230 is configured to store the location of the searched item in a database maintained by the server. In other words, storing the location of the searched item in the database allows for future retrieval of the location of the searched item. In other words, subsequent requests to search for the item will be addressed by retrieving the location of the searched item from the database.

In various embodiments, the determination module 230 is configured to detect that a new item is moved to a location within the predefined distance from the sensor. Also, the determination module 230 performs the detection based on the sensor data. For instance, the sensor data may include a first set of sensor data and a second set of sensor data. Further, the determination module 230 compares the first set of sensor data with the second set of sensor data. The first set of sensor data corresponds to data that was captured during a first moment and the second set of sensor data corresponds to data that was captured during a second moment. Further, the first moment and the second moment are a separated by a predetermined interval of time. Also, the new item is not indicated by the first set of sensor data, but instead is indicated by the second set of sensor data.

In further embodiments, the determination module 230 is configured to determine that an item is moved from a first location within the predefined distance from a first sensor to a second location within the predefined distance from a second sensor. Further, the determination module 230 performs the determination based on first sensor data from the first sensor and second sensor data from the second sensor.

In various embodiments, the display module 240 is configured to cause display of the location of the searched item in a user interface of an application on a client device. The display module 240 is also further to cause display of an image of the searched item in the user interface of the application.

In further embodiments, the display module 240 is to cause display of a notification that indicates the number of items within the predefined distance from the sensor. In some instances, the notification is caused by the request for the notification received at the reception module 210. The notification is also displayed by the display module 240 based on the determination performed by the determination module 230 that the counted number of items is less than the threshold number.

In further embodiments, the display module 240 causes display of a notification that indicates movement of the new item. In this regard, the display module 240 causes display of a notification that indicates that the new item is moved to the location within the predefined distance from the sensor.

In various embodiments, the generation module 250 is configured to generate an image of the searched item based on the sensor data. Moreover specifically, the generation module 250 may use visual data that indicates the corresponding item to generate the image of the searched item. For instance, the visual data of the corresponding item may be an image of the corresponding item or a video of the corresponding item. Further, the generation module 250 uses the image of the corresponding item to generate a thumbnail image of the searched item. Alternatively, the generation module 250 selects a frame from the video of the corresponding item and uses the selected frame to generate the image of the searched item.

Figure 3:
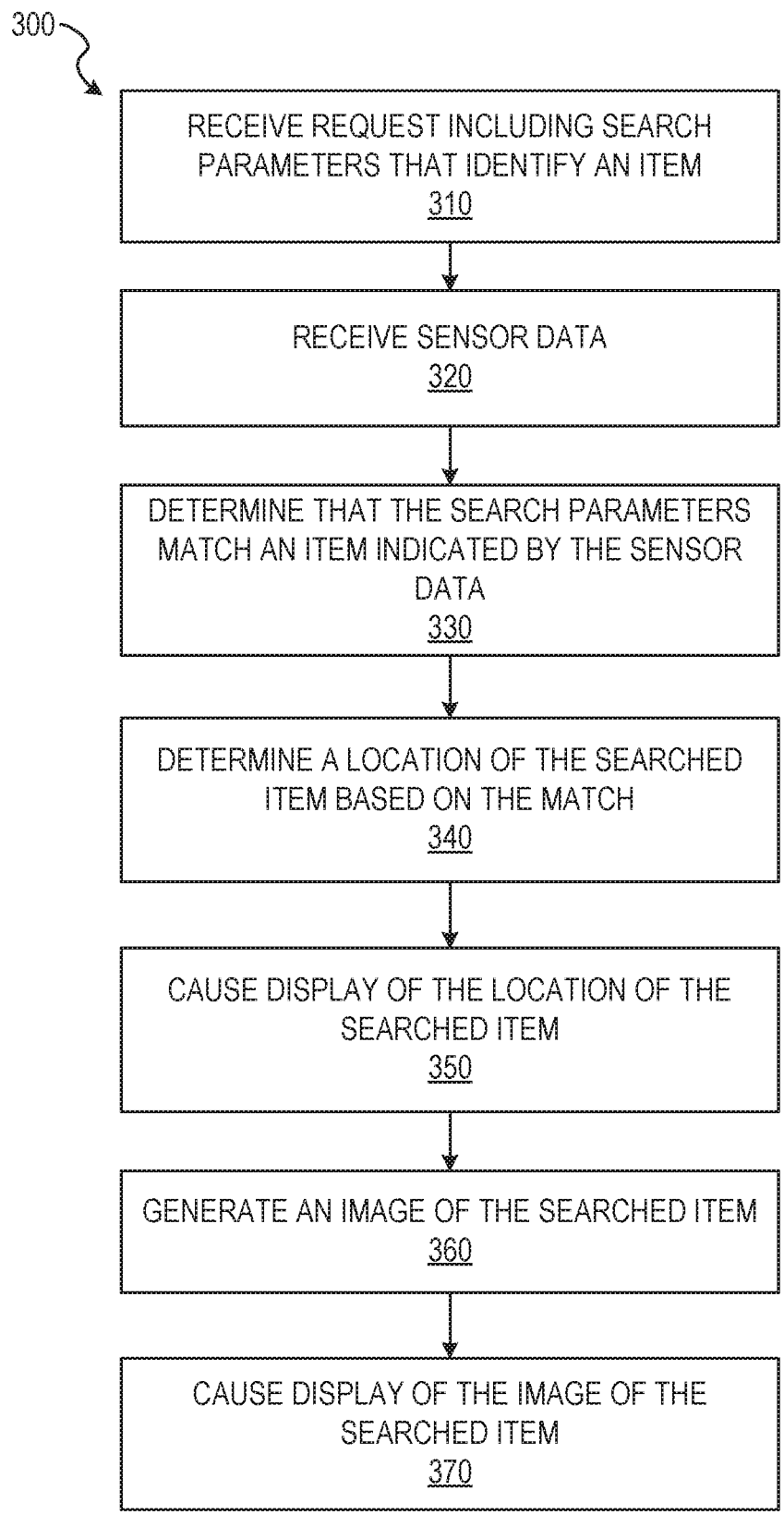
FIGS. 3-4 are flowcharts illustrating operations of the search system in performing a method of determining a location for a searched item, according to some example embodiments.
Figure 4:
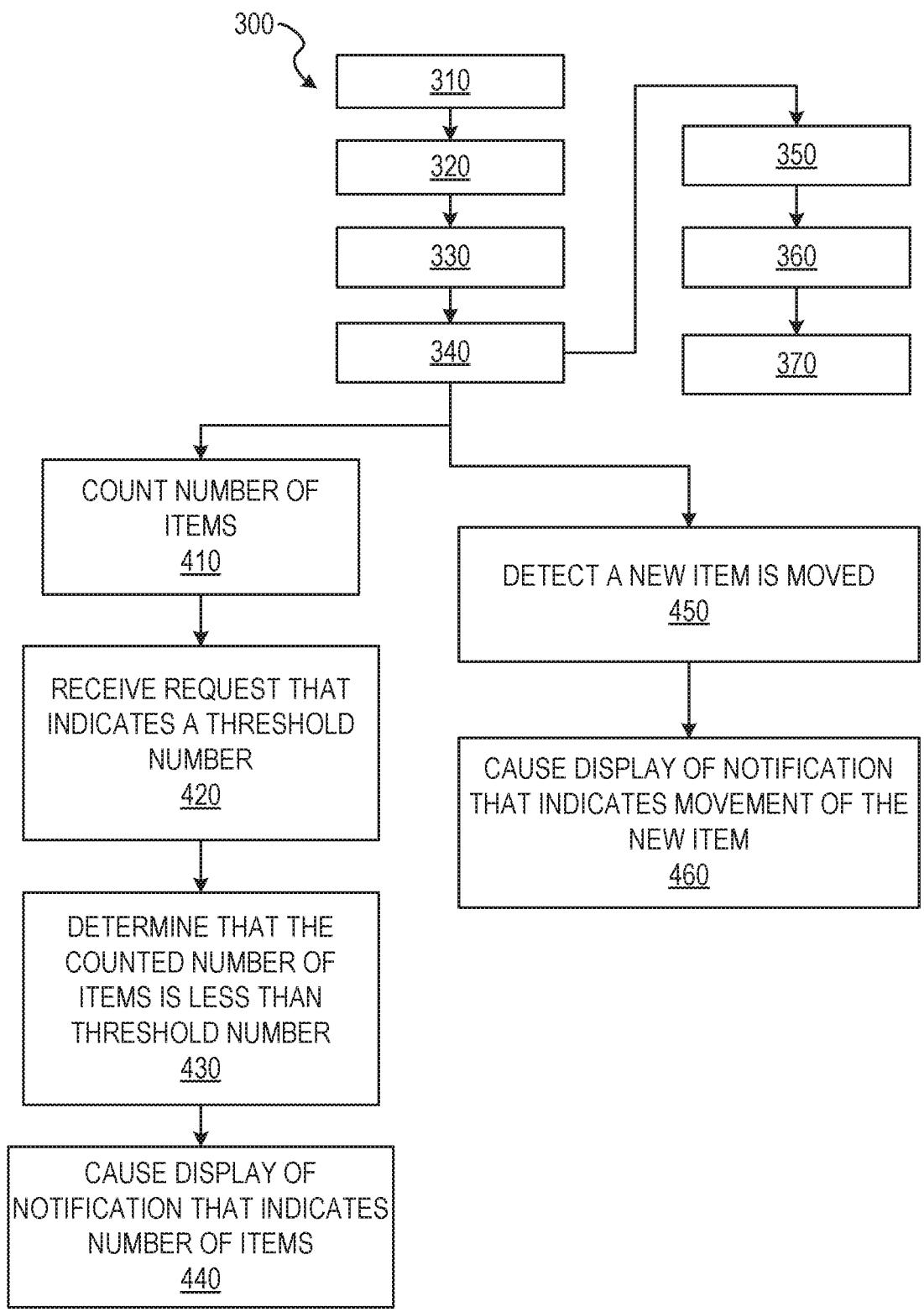

FIGS. 3-4 are flowcharts illustrating operations of the search system 150 in performing a method 300 of determining a location for a searched item, according to some example embodiments. Operations in the method 300 may be performed by the search system 150, using modules described above with respect to FIG. 2. As shown in FIG. 3, the method 300 includes operations 310, 320, 330, 340, 350, 360, and 370.

At operation 310, the reception module 210 receives a search for an item located within the predefined distance from the sensor. The search may also include search parameters that identify the searched item. For example, the search parameters may include an image of the searched item. In other words, a user of the client device may have previously saved a picture of the searched item on the client device. Also, the search parameters may include keywords or a description of the searched item. For example, the description indicates a color of the searched item, a size of the searched item, dimensions of the searched item, and the like.

At operation 320, the reception module 210 receives sensor data that indicates items located within a predefined distance the sensor. The sensor data includes visual data that indicates the items located within the predefined distance from the sensor. For example, the visual data includes video footage of the items located within the predefined distance from the sensor. Alternatively, the visual data includes images of the items located within the predefined distance from the sensor. In various example embodiments, the sensor is placed inside of a safe where secure items are kept.

At operation 330, the determination module 230 determines that the search parameters match with a corresponding item among the items indicated by the sensor data as being located within the predefined distance from the sensor. More specifically, the determination module 230 compares the search parameters with the sensor data in order to determine the match. In the case that the search parameters is an image of the searched object, the determination module 230 is to compare the image of the searched object with visual data that indicates the corresponding item. In the case that the search parameters is a description of the searched object, the determination module 230 is to compare the description of the searched item with the retrieved identifier or additional identifier of the corresponding item.

At operation 340, the determination module 230 determines a location of the searched item based on the match. As stated earlier, since the location of the searched item is determined as being where the corresponding item is located, the determination module 230 is further to determine the location of the corresponding item among the items indicated by the sensor data as being within the predefined distance from the sensor.

At operation 350, the display module 240 causes display of the location of the searched item in a user interface of an application on a client device. The user interface of the application, in some instances, includes a search results page that displays the location of the searched item. Further, the location of the searched item, in some instances, is presented alongside a description of the searched item. In some cases, the description of the searched item is the same as the one submitted as part of the search parameters.

At operation 360, the generation module 250 generates an image of the searched item. As stated previously, the generation module 250 uses the visual data that indicates the corresponding item in order to generate the image of the searched item. Further, the visual data of the corresponding item may be an image of the corresponding item or may be a video of the corresponding item.

At operation 370, the display module 240 causes display of the generated image of the searched item. More specifically, in some instances, the display module 240 causes display of the generated image in the user interface of the application that also includes the location of the searched item.

As shown in FIG. 4, the method 300 may include one or more of operations 410, 420, 430, 440, 450, and 460.

At operation 410, the identification module 220 counts a number of items located within the predefined distance from the sensor based on the sensor data. As stated above, the sensor data includes visual data that indicates identifiers of the items located within the predefined distance from the sensor. Accordingly, in some instances, the identification module 220 counts a number of unique barcodes or identifiers that are included in the sensor data.

At operation 420, the reception module 210 receives a request from the client device to receive notifications regarding the items within the predefined distance from the sensor. The request also indicates a threshold number. In some instances, the search application includes a request interface that allows for the user to submit the request to receive notifications. Accordingly, the request is submitted via the search application from the request interface.

At operation 430, the determination module 230 determines that the counted number of items is less than the threshold number.

At operation 440, the display module 240 causes display of a notification that indicates the number of items within the predefined distance from the sensor. In some instances, the notification is a displayed on the client device as part of the search application. Alternatively, the notification is displayed on the client device independently of the search application (e.g., the search application is not actively being displayed on a screen of the client device). Also, the display of the notification is performed in response to the determination that the counter number of items is less than the threshold number. In the case of the sensor being located in the safe, the notification is displayed when the number of items within the safe fall below the threshold number as indicated in the request.

At operation 450, the determination module 230 detects that a new item is moved to a location within the predefined distance from the sensor.

At operation 460, the display module 240 causes display of a notification that indicates movement of the new item. In some instances, the notification is a displayed on the client device as part of the search application. Alternatively, the notification is displayed on the client device independently of the search application (e.g., the search application is not actively being displayed on a screen of the client device).

Figure 5:
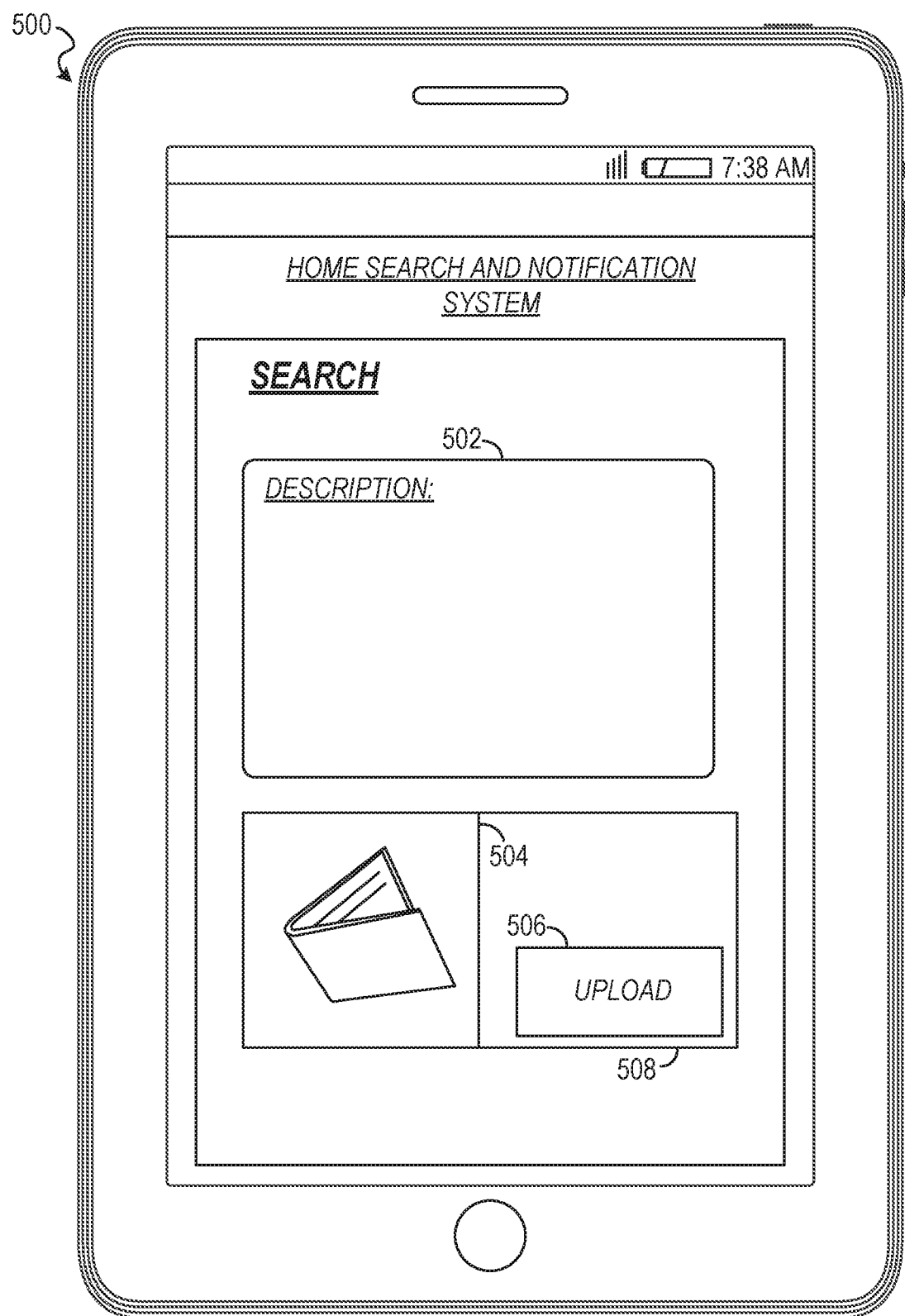
FIG. 5-10 are block diagrams illustrating an example user interface of a search application, according to some example embodiments.

FIG. 5 is a block diagram illustrating an example user interface 500 of a search application, according to some example embodiments. The user interface 500 may be displayed on a client device of a user. Further, the user interface 500 includes a description section 502 where the user may input a description of an item as part of a request to locate the item (e.g., wallet). The user interface 500 also includes an image section 508 where the user may upload an image 504 of an item as part a request to locate the item (e.g., wallet). Further, the user interface 500 includes a button 506 that is configured to upload the image 504 of the item to the search system 150. In other words, each of the image 504 of the item and the description of the item are search parameters entered by the user to identify the item that is the user is trying to locate.

Figure 6:
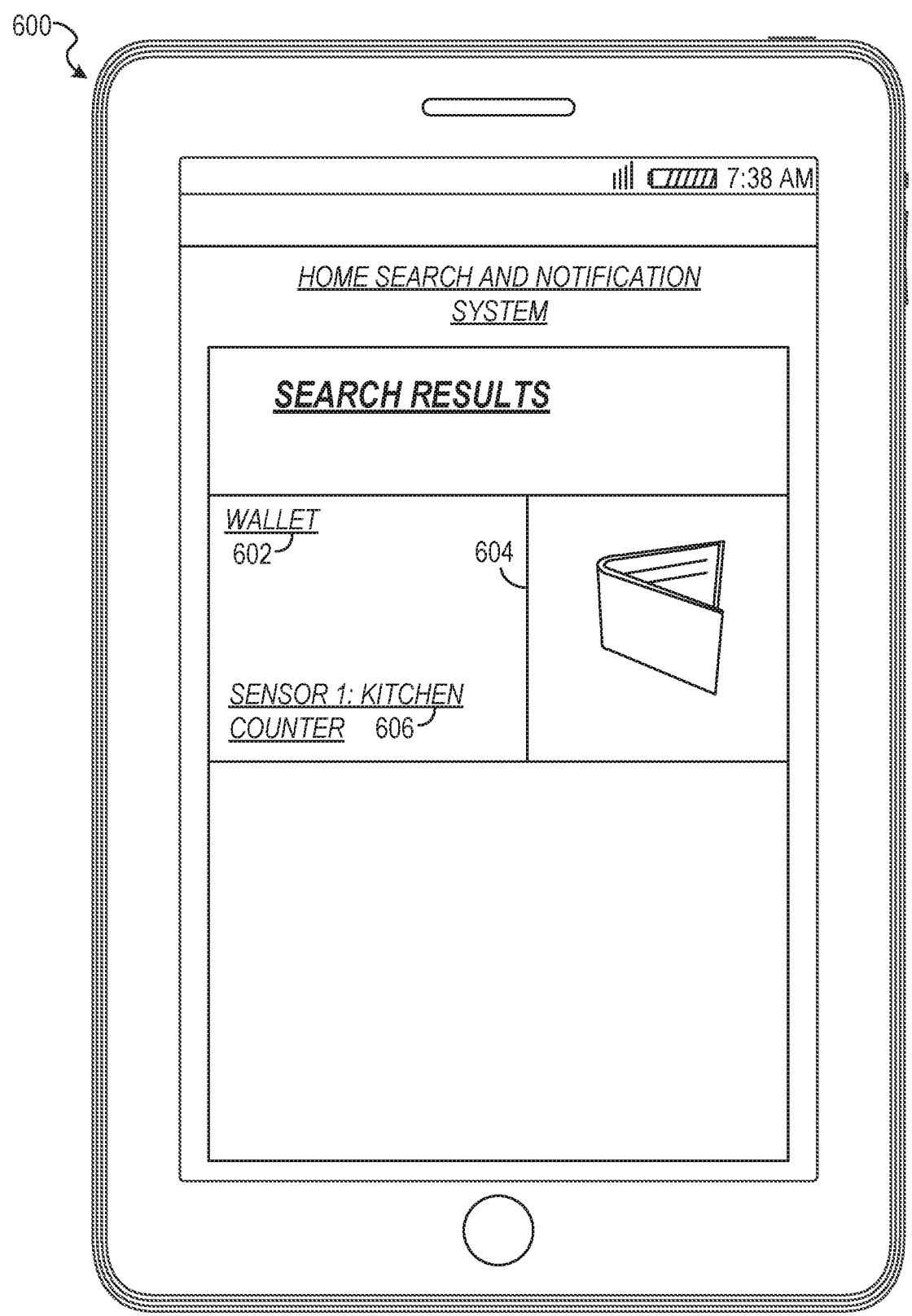

FIG. 6 is a block diagram illustrating an example user interface 600 of a search application, according to some example embodiments. The user interface 600 may be displayed on a client device of a user after the user interface 500 of FIG. 5 is displayed. As shown, the user interface 600 includes a description of an item 602, an image of the item 604, and a location of the item 606. The user interface 600 depicts a search result of an item that matches the search parameters entered by the user in FIG. 5. Moreover, the item is indicated by sensor data as being located within a predefined distance from a sensor. As shown in the user interface 600, the location of the item 606 corresponds to a sensor located on a kitchen counter.

Figure 7:
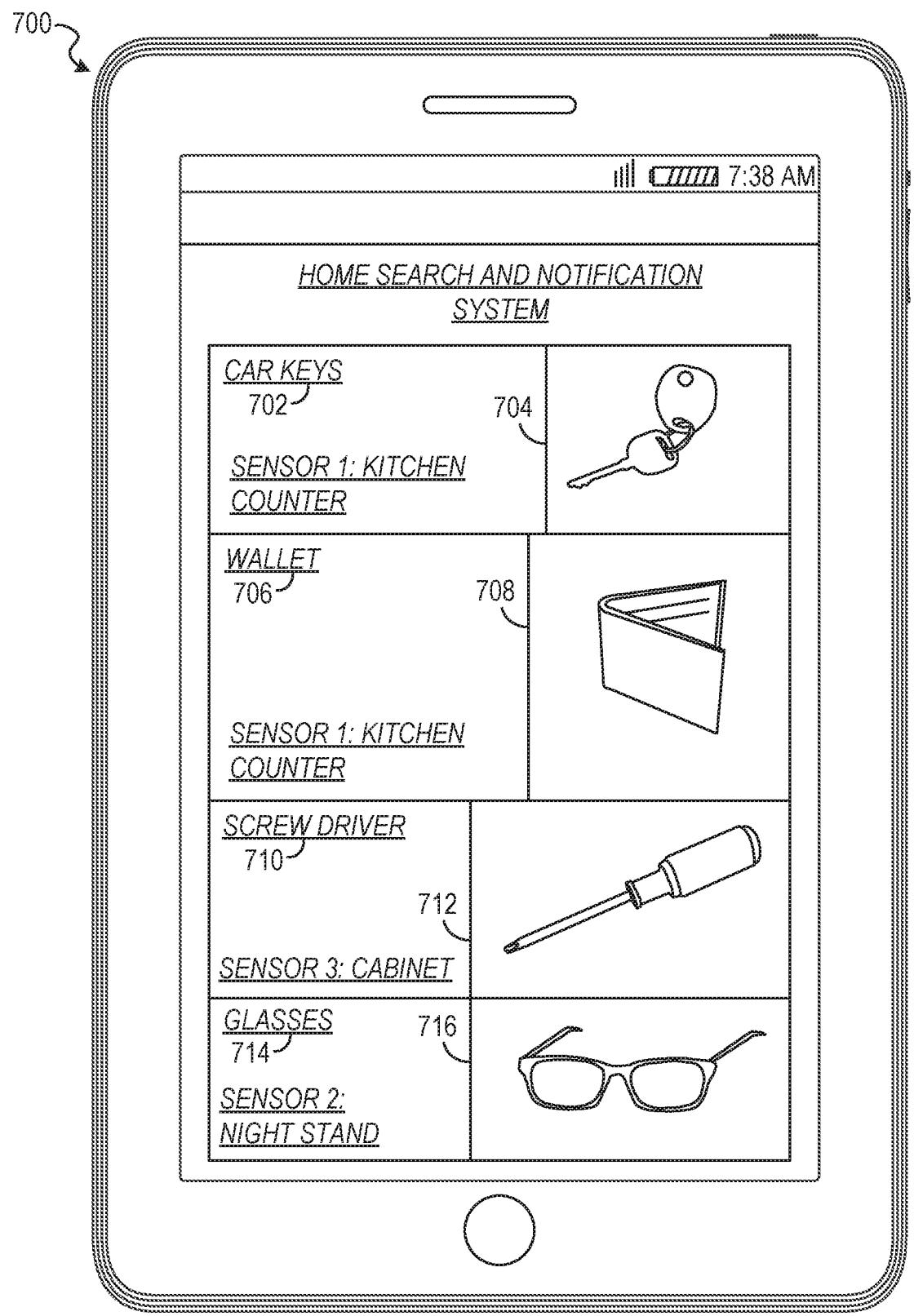
Figure 8:
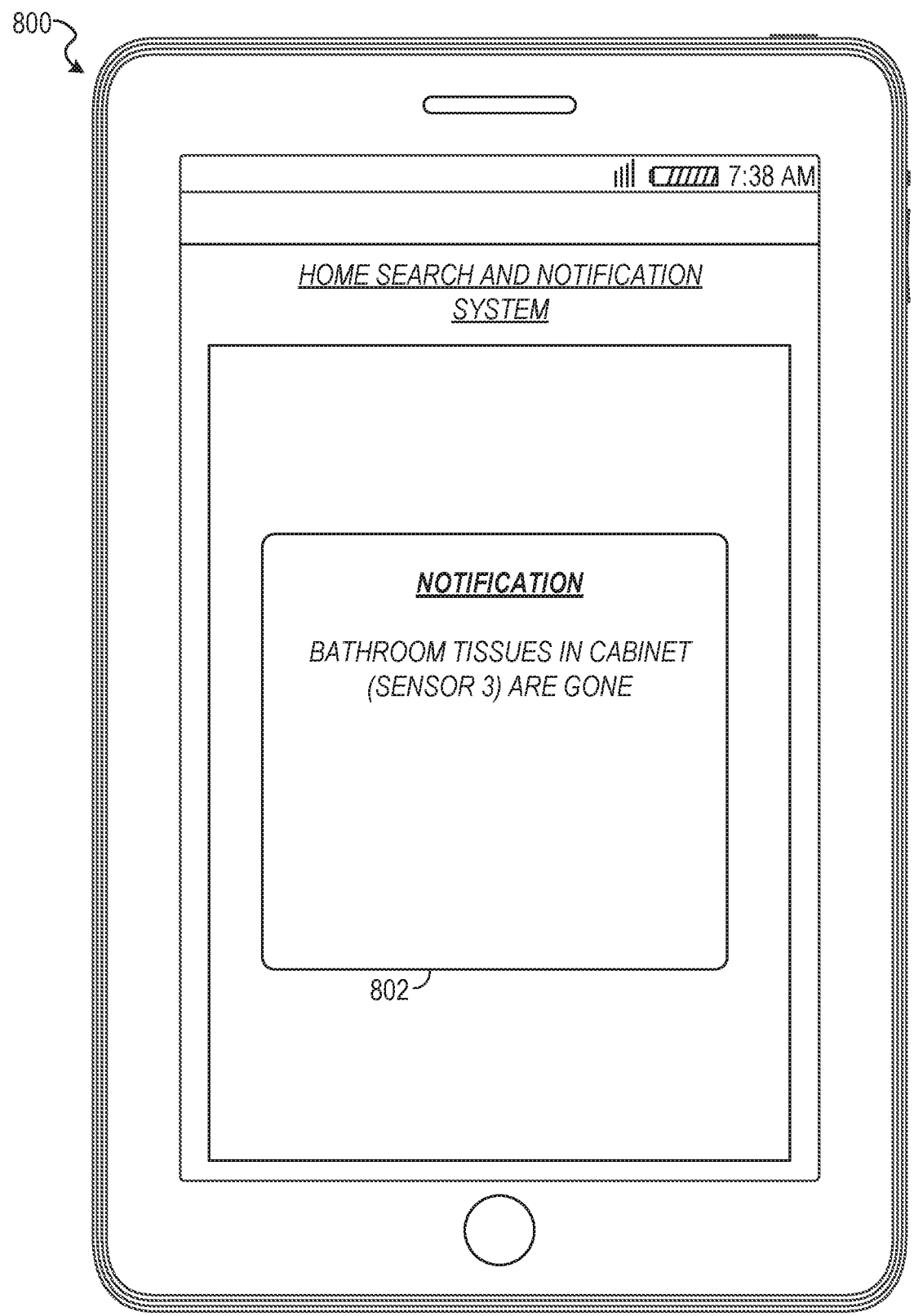

FIG. 7 is a block diagram illustrating an example user interface 700 of a search application, according to some example embodiments. As shown, the user 700 interface includes four sections. The first section includes a first description 702 and a first image 704. The second section includes a second description 706 and a second image 708. The third section includes a third description 710 and a third image 712. The fourth section includes a fourth description 714 and a fourth image 716. Also, the user interface 700 may be displayed on a client device of a user. The user interface 700 depicts items that are indicated by sensors that are placed around a home. For instance, the first description 702 describes a first item that is indicated by sensor data from a sensor placed on a kitchen counter. The second description 706 describes a second item that is indicated by sensor data from the sensor placed on the kitchen counter. The third description 710 describes a third item that is indicated by sensor data from a sensor placed inside a cabinet. The fourth description 714 describes a fourth item that is indicated by sensor data from a sensor placed on a night stand, FIG. 8 is a block diagram illustrating an example user interface 800 of a search application, according to some example embodiments. The user interface 800 may be displayed on a client device of a user. As shown, the user interface 800 includes a notification 802. The notification 802 indicates that a number of items indicated by the sensor falls below a threshold number. Also, the notification 802 is displayed in response to a determination that the number of items is below the threshold number.

Figure 9:
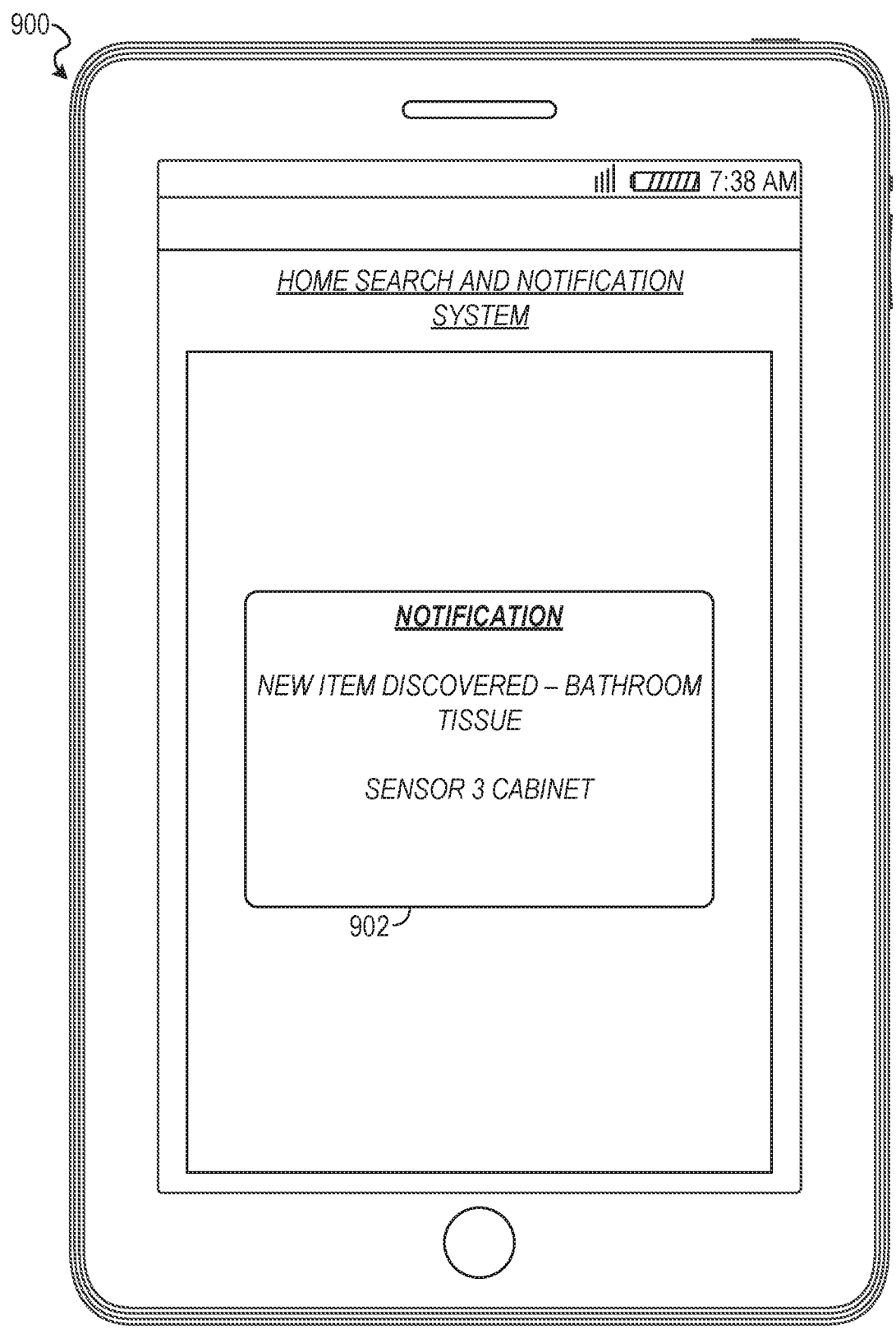

FIG. 9 is a block diagram illustrating an example user interface 900 of a search application, according to some example embodiments. The user interface 900 may be displayed on a client device of a user. As shown, the user interface 900 includes a notification 902. The notification 902 indicates that a new item is moved to a location within a predefined distance from a sensor.

Figure 10:
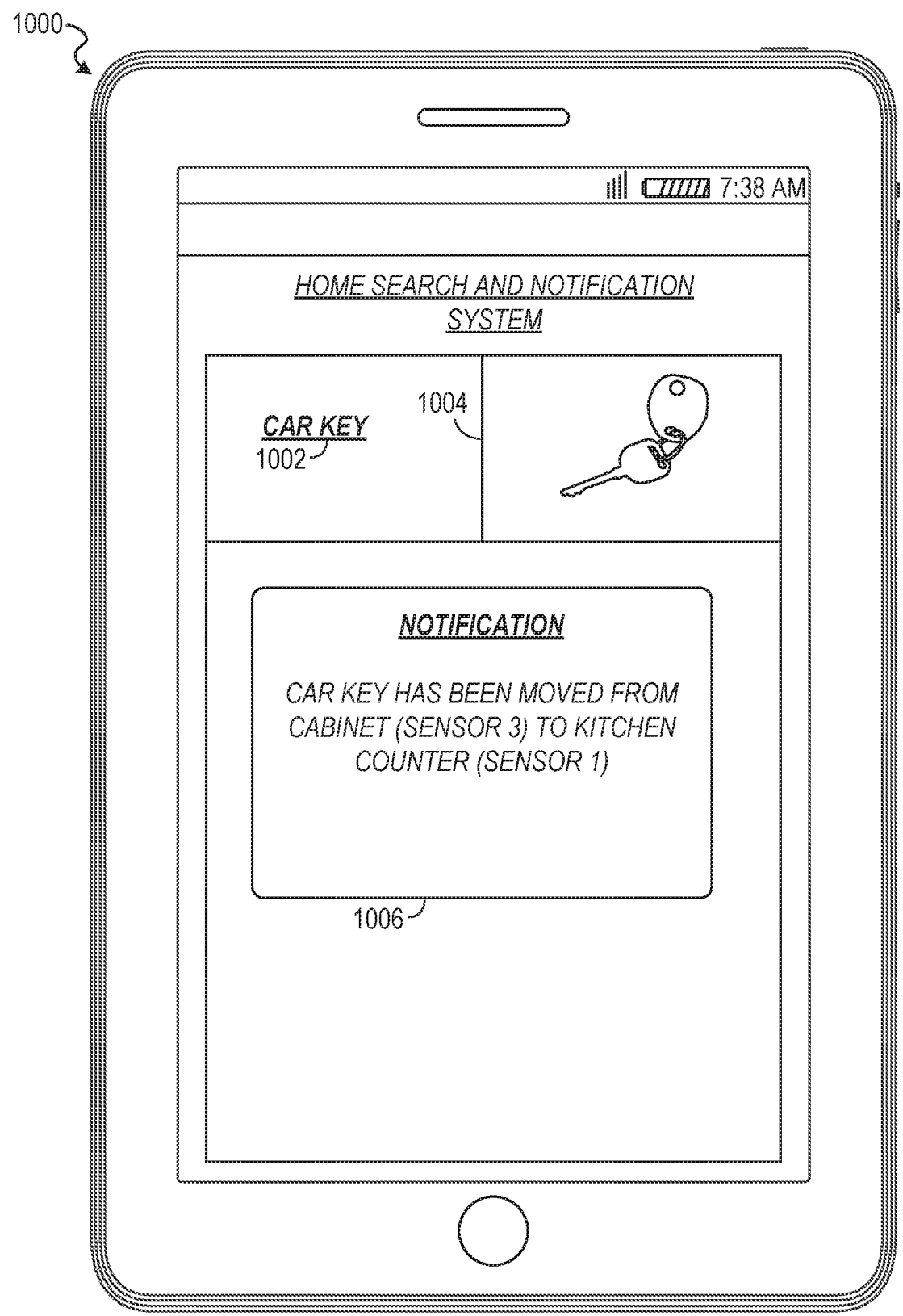

FIG. 10 is a block diagram illustrating an example user interface 1000 of a search application, according to some example embodiments. The user interface 1000 may be displayed on a client device of a user. As shown, the user interface 1000 includes a description 1002 of an item, an image 1004 of the item, and a notification 1006. The notification indicates that the item has been moved from an area located within a predefined distance from a third sensor (e.g., cabinet) to an area located within a predefined distance from a first sensor (e.g., kitchen counter).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 11:
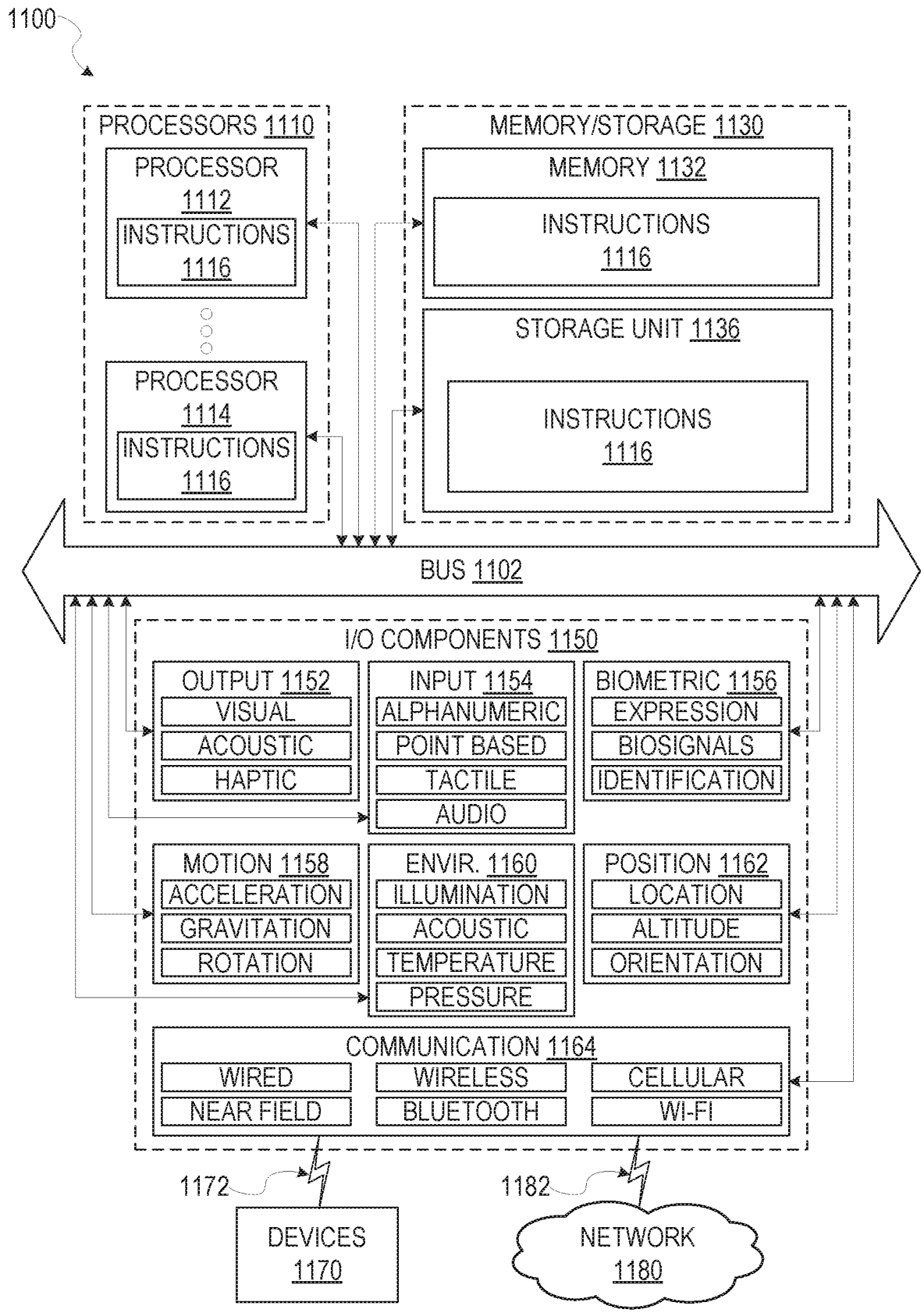
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an apples, an app, or other executable code) for causing the machine 1100 to perform any one or more of the methodologies discussed herein may be executed. For example the instructions may cause the machine to execute the flow diagrams of FIGS. 3-5. Additionally, or alternatively, the instructions may implement the modules depicted in FIG. 2, and so forth. The instructions transform the general, non-programmed machine into a particular machine specially configured to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116, The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180, In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (ALAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus comprising:
hardware processing circuitry;

hardware memory storing instructions that when executed cause the hardware processing circuitry to perform operations, the operations comprising:

receiving input defining an image of a search item, receiving input indicating an instruction to search a plurality of sensor data for the image of the search item, each sensor data generated by a corresponding imaging sensor and including a respective image captured by the corresponding imaging sensor, and displaying a location of an identified item matching the searched item in a user interface, the location corresponding to a location of one of the imaging sensors that generated an image-representing the identified item.

2. The apparatus of claim 1, the operations further comprising displaying in the user interface, an indication of a number of items in the image representing the identified item.

3. The apparatus of claim 2, the operations further comprising transmitting a request to a server for notifications of items represented by images captured by the one of the imaging sensors, the request indicating a threshold number of items, wherein the display of the location is in response to a message from the server indicating detection of the threshold number of items in the image representing the identified item.

4. The apparatus of claim 1, the operations further comprising displaying a message indicating a number of items represented by a second image is below a threshold number, the second image captured by a second imaging sensor.

5. The apparatus of claim 1, the operations further comprising displaying a message indicating a second item has been moved from an area located within a predefined distance from a second imaging sensor to an area located within a second predefined distance from a different imaging sensor.

6. The apparatus of claim 1, the operations further comprising displaying a message indicating a second item is moved to a location within a predefined distance from a second imaging sensor.

7. The apparatus of claim 1, the operations further comprising displaying a section of the user interface including a description and a second image, the description indicating a first location of an imaging sensor, the second image indicating an item identified based on imaging sensor data from the imaging sensor.

8. The apparatus of claim 7, the operations further comprising displaying a second section including a second description and third image, the description indicating a second location of a second imaging sensor, the third image indicating a second item identified based on second sensor data from the second imaging sensor.

9. The apparatus of claim 8, the operations further comprising displaying a third section including a third description and a fourth image, the description indicating a third location of a third imaging sensor, the third image indicating a third item identified based on third sensor data from the third imaging sensor.

10. A method comprising:

receiving, via processing circuitry, input defining an image of a search item, receiving input indicating an instruction to search a plurality of sensor data for the image of the search item, each sensor data generated by a corresponding imaging sensor and including a respective image captured by the corresponding imaging sensor, and displaying a location of an identified item matching the searched item in a user interface, the location corresponding to a location of one of the imaging sensors generated an image representing the identified item.

11. The method of claim 10, further comprising displaying in the user interface, an indication of a number of items in the image representing the identified item.

12. The method of claim 11, further comprising transmitting a request to a server for notifications of items represented by images captured by the one of the imaging sensors, the request indicating a threshold number of items, wherein the display of the location is in response to a message from the server indicating detection of the threshold number of items in the image representing the identified item.

13. The method of claim 10, further comprising displaying a message indicating a number of items represented by a second image, the second image generated by a second imaging sensor, is below a threshold number.

14. The method of claim 10, further comprising displaying a message indicating a second item has been moved from an area located within a predefined distance from a second imaging sensor to an area located within a second predefined distance from a different imaging sensor.

15. The method of claim 10, further comprising displaying a message indicating a second item is moved to a location within a predefined distance from a second imaging sensor.

16. The method of claim 10, further comprising displaying a section of the user interface including a description and a second image, the description indicating a first location of an imaging sensor, the second image indicating an item identified based on imaging sensor data from the imaging sensor.

17. The method of claim 16, further comprising displaying a second section including a second description and third image, the description indicating a second location of a second imaging sensor, the third image indicating a second item identified based on second sensor data from the second imaging sensor.

18. The method of claim 17, further comprising displaying a third section including a third description and a fourth image, the description indicating a third location of a third imaging sensor, the third image indicating a third item identified based on third sensor data from the third imaging sensor.

19. A non-transitory computer readable medium comprising instructions that when executed cause processing circuitry to perform operations comprising:

receiving, via processing circuitry, input defining an image of a search item, receiving input indicating an instruction to search a plurality of sensor data for the image of the search item, each sensor data generated by a corresponding imaging sensor and including a respective image captured by the corresponding imaging sensor, and displaying a location of an identified item matching the searched item in a user interface, the location corresponding to a location of one of the imaging sensors generated an image representing the identified item.

20. The non-transitory computer readable medium of claim 19, further comprising transmitting a request to a server for notifications of items represented by the captured one respective image, the request indicating a threshold number of items, wherein the display of the location is in response to a message from the server indicating detection of the threshold number of items in the image representing the identified item.

\* \* \* \* \*